(12) United States Patent
Pugh et al.

(10) Patent No.: US 7,891,852 B2
(45) Date of Patent: Feb. 22, 2011

(54) ILLUMINATION SYSTEM USING PHOSPHOR REMOTE FROM LIGHT SOURCE

(75) Inventors: Mark Pugh, Los Gatos, CA (US); Gerard Harbers, Sunnyvale, CA (US)

(73) Assignees: Koninklijke Philips Electronics NV, Eindhoven (NL); Philips Lumileds Lighting Company, LLC, San Jose, CA (US)

( * ) Notice: Subject to any disclaimer, the term of this patent is extended or adjusted under 35 U.S.C. 154(b) by 84 days.

(21) Appl. No.: 11/252,421

(22) Filed: Oct. 17, 2005

(65) Prior Publication Data

US 2007/0086184 A1 Apr. 19, 2007

(51) Int. Cl.
*F21V 7/04* (2006.01)
(52) U.S. Cl. .................. 362/606; 362/607; 362/612; 362/616; 362/617; 362/629
(58) Field of Classification Search .................. 362/606, 362/607, 616, 611, 612, 622, 629, 97.1, 97.3, 362/617
See application file for complete search history.

(56) References Cited

U.S. PATENT DOCUMENTS

| | | | |
|---|---|---|---|
| 5,739,879 A | 4/1998 | Tsai | |
| 6,464,366 B1* | 10/2002 | Lin et al. | 362/616 |
| 6,536,914 B2* | 3/2003 | Hoelen et al. | 362/231 |
| 6,561,661 B2* | 5/2003 | Egawa | 362/27 |
| 6,637,905 B1* | 10/2003 | Ng et al. | 362/601 |
| 6,655,810 B2* | 12/2003 | Hayashi et al. | 362/600 |
| 6,749,311 B2* | 6/2004 | Suzuki et al. | 362/610 |
| 6,811,275 B2* | 11/2004 | Suzuki et al. | 362/609 |
| 6,871,973 B2* | 3/2005 | Ju | 362/26 |
| 7,014,347 B2* | 3/2006 | Okuwaki | 362/555 |
| 7,021,812 B2* | 4/2006 | Maeda et al. | 362/608 |
| 7,036,946 B1* | 5/2006 | Mosier | 362/27 |
| 7,134,777 B2* | 11/2006 | Sung | 362/609 |
| 7,255,469 B2* | 8/2007 | Wheatley et al. | 362/609 |
| 7,263,268 B2* | 8/2007 | Inditsky | 385/146 |
| 7,537,374 B2* | 5/2009 | Schardt et al. | 362/623 |
| 2003/0058634 A1* | 3/2003 | Kunimochi et al. | 362/31 |
| 2003/0169585 A1* | 9/2003 | Okuwaki | 362/31 |
| 2004/0100789 A1 | 5/2004 | Ju | |
| 2005/0254258 A1* | 11/2005 | Lee | 362/612 |
| 2006/0002141 A1* | 1/2006 | Ouderkirk et al. | 362/609 |
| 2006/0209564 A1* | 9/2006 | Lin et al. | 362/609 |

FOREIGN PATENT DOCUMENTS

| | | |
|---|---|---|
| CN | 1383498 A | 12/2002 |
| CN | 1407384 A | 4/2003 |
| WO | 0184229 A1 | 11/2001 |

OTHER PUBLICATIONS

Merriam-Webster's Collegiate Dictionary, 1998, Tenth Edition, p. 746.*

* cited by examiner

*Primary Examiner*—Jong-Suk (James) Lee
*Assistant Examiner*—David J Makiya

(57) ABSTRACT

The invention provides an illumination system and a method for illumination. The illumination system includes one or more light sources that produce a primary light, a light-mixing zone that homogenizes the primary light, a wavelength-converting layer that converts the primary light to a secondary light, and a light-transmitting zone that receives the secondary light and transmits the secondary light to, for example, a Liquid Crystal Display (LCD).

17 Claims, 9 Drawing Sheets

ILLUMINATION SYSTEM USING PHOSPHOR REMOTE FROM LIGHT SOURCE

BACKGROUND

The invention relates generally to the field of illumination systems, and more specifically, to illumination systems using a wavelength-converting material, such as phosphor, located remotely from the light source, such as a light emitting diode.

Illumination systems are widely used to backlight display devices such as televisions, laptops, and Personal Digital Assistants (PDAs); to light up shelves in cabinets and kitchens; and for signage and contour lighting. An illumination system may include a light source that is coupled to an optical waveguide. The optical waveguide transmits the light produced by the light source to, for example, a display device.

Some existing illumination systems include Cold Cathode Fluorescent Lamps (CCFLs) as light sources. The light emitted by CCFLs is coupled into an optical waveguide, which transmits the light. However, CCFLs contain mercury, which may cause environmental hazards. Moreover, CCFLs are large in size and require high operational voltages.

Illumination systems that include Light Emitting Diodes (LEDs) as light sources are gaining in popularity. An example of the existing illumination systems that include LEDs as light sources are illumination systems that have a plurality of LEDs producing, for example, a white light or red, blue and green lights. The red, blue and green lights may be mixed to generate, for example, a substantially white light. Further, the existing illumination systems include packaging around the light sources to improve the efficiency of the existing illumination systems.

The packaging around the light sources increases the size of the existing illumination systems. In the existing illumination systems using LEDs, the red, blue and green lights have to be uniformly mixed to generate a substantially white light. However, it is difficult to achieve consistency in the spatial spectral distribution and brightness of the light in the existing illumination systems. Moreover, due to transmission losses, the efficiency of the existing illumination systems is low.

SUMMARY

An object of the invention is to provide an illumination system.

Another object of the invention is to provide an illumination system, which produces a uniform bright light with a consistent spatial spectral distribution, while using a considerably less amount of space than the existing illumination systems.

Various embodiments of the invention provide an illumination system and a method for illumination. In accordance with an embodiment of the invention, the illumination system includes one or more light sources, a light-mixing zone, a wavelength-converting layer, and a light-transmitting zone. The light sources produce a primary light. The wavelength-converting layer converts the primary light to a secondary light. The light-transmitting zone substantially transmits the secondary light towards, for example, a Liquid Crystal Display (LCD). Further, one or more intermediate layers may be included between the light-transmitting zone and the LCD, for example, to distribute the secondary light uniformly over the LCD.

In accordance with another embodiment of the invention, the method for illumination includes producing and homogenizing a primary light, converting the primary light to a secondary light, and substantially transmitting the secondary light towards, for example, an LCD.

BRIEF DESCRIPTION OF THE DRAWINGS

Various embodiments of the invention will hereinafter be described in conjunction with the appended drawings, provided to illustrate and not to limit the invention, wherein like designations denote like elements, and in which:

FIG. 1b illustrates a display system, in accordance with FIG. 1a;

FIG. 2a is a cross section of an illumination system, in accordance with FIG. 1a;

FIG. 3c is a cross section of an illumination system, in accordance with FIG. 3a;

FIG. 3d is a cross section of an illumination system, in accordance with FIG. 3a.

DESCRIPTION OF VARIOUS EMBODIMENTS

Various embodiments of the invention provide an illumination system and a method for illumination. In accordance with an embodiment of the invention, the illumination system may be used, for example, to illuminate a Liquid Crystal Display (LCD).

Figure 1A:
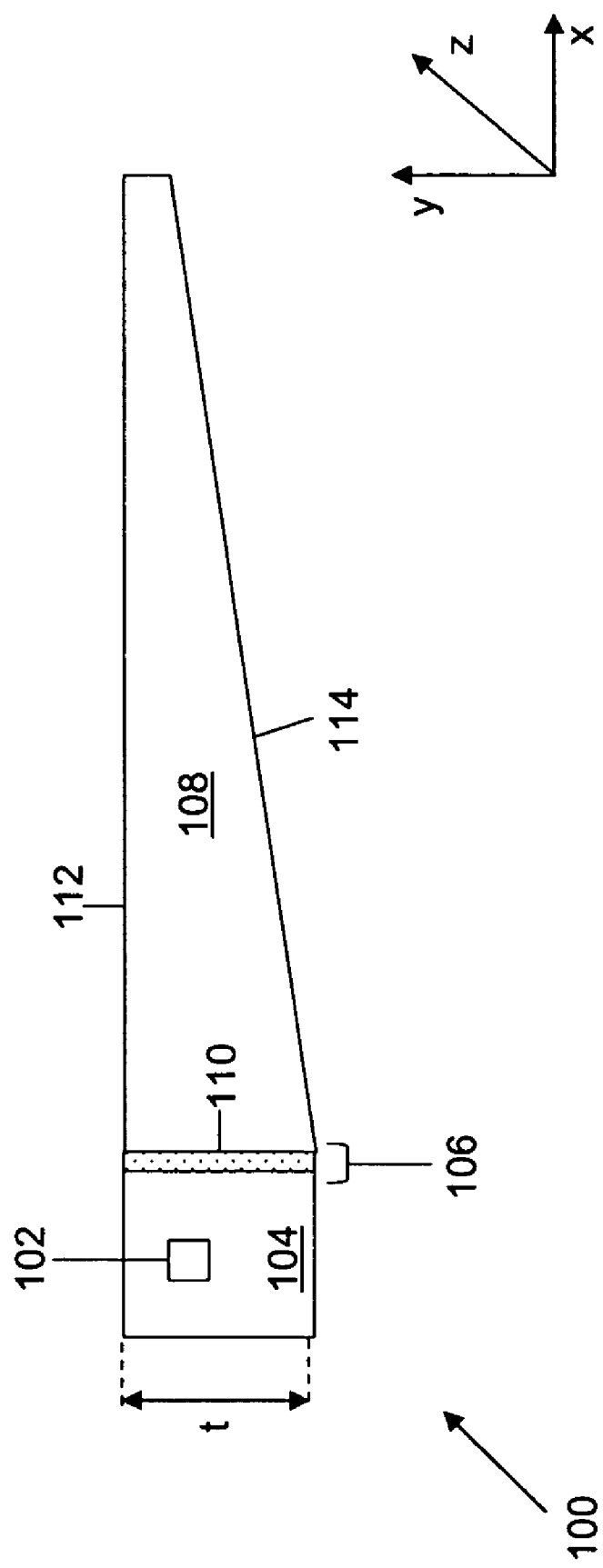
FIG. 1a illustrates an illumination system, in accordance with an embodiment of the invention.

FIG. 1a illustrates an illumination system 100, in accordance with an embodiment of the invention. Illumination system 100 includes one or more light sources 102, hereinafter referred to as light sources 102, a light-mixing zone 104, a wavelength-converting layer 106, and a light-transmitting zone 108. Light-transmitting zone 108 includes a first surface 110, one or more transmitting surfaces such as a transmitting surface 112, and one or more remaining edge surfaces such as a remaining edge surface 114. In accordance with various embodiments of the invention, first surface 100, the one or more transmitting surfaces and the one or more remaining edge surfaces combine to form a closed structure.

Light sources 102 produce a primary light, which may be, for example, a blue light, an Ultra Violet (UV) light or a near-UV light. Light-mixing zone 104 is coupled to light sources 102, and receives the primary light from light sources 102. The primary light is homogenized in light-mixing zone 104, for example, to achieve a spatially uniform spectral distribution and a uniform brightness of the primary light. Light-mixing zone 104 distributes the homogenized primary light uniformly over wavelength-converting layer 106, which is coupled to light-mixing zone 104. The homogenization of the primary light in light-mixing zone 104 is explained in detail in conjunction with FIG. 2a.

Wavelength-converting layer 106 converts the primary light to a secondary light. The secondary light may be, for example, a white light. In accordance with an embodiment of the invention, wavelength-converting layer 106 may be a phosphor layer such as a red and green phosphor layer, a blue, red, and green phosphor layer and an Yttrium Aluminium Garnet (YAG) phosphor layer. Wavelength-converting layer 106 may be planar or may have a different shape.

First surface 110 of light-transmitting zone 108 is associated with wavelength-converting layer 106. Herein, the association may include, for example, the introduction of zero or more intermediate layers between wavelength-converting layer 106 and first surface 110. First surface 110 receives the secondary light from wavelength-converting layer 106. Transmitting surface 112 transmits the secondary light received by first surface 110 such that the secondary light may be used, for example, to illuminate an LCD. In accordance with an embodiment of the invention, transmitting surface 112 may be situated adjacent to first surface 110. In particular, the central plane of transmitting surface 112 may be substantially perpendicular to the central plane of first surface 110.

In accordance with an embodiment of the invention, each of light sources 102 may include one or more Light Emitting Diodes (LEDs). Further, each of the LEDs may be a blue LED, an Ultra Violet (UV) LED, a near-UV LED, and the like. In accordance with an embodiment of the invention, the LEDs included in light sources 102, may be coated with an encapsulating material. The encapsulating material may perform the functions of, for example, extracting light from the LEDs, and optimizing the radiation profile to get higher coupling efficiency, or better uniformity. Further, the encapsulating material may include, for example, a phosphor, to produce the primary light with the desired spatial spectral distribution.

In accordance with another embodiment of the invention, light sources 102 may include LED power packages. Examples of the LED power packages include Luxeon™-type LEDs, and the like. Herein, the luminous flux of the LED power packages is substantially higher than that of conventional LEDs.

In accordance with an embodiment of the invention, the amount of the primary light produced by an LED, as one of light sources 102, may be regulated in response to the illumination required from illumination system 100. The regulation of the amount of the primary light produced by the LED may be achieved by, for example, varying the current through the LED. Further, the amount of the primary light produced by light sources 102 may be regulated by varying the number of LEDs included in each of light sources 102.

In accordance with an embodiment of the invention, light-mixing zone 104 may be, for example, a light guide, a hollow light guide, a hollow plastic casing, and the like. Light-mixing zone 104 may be made of, for example, a synthetic resin, acryl, polycarbonate, PMMA, glass, and the like. Further, light-mixing zone 104 may be a solid zone or may include an air cavity. In accordance with an embodiment of the invention, the thickness of light-mixing zone 104, hereinafter referred to as t, may lie between 1 mm to 10 mm. In accordance with an embodiment of the invention, t is equal to 2.5 mm. Herein, t is the dimension along the y-axis (as shown in FIG. 1a) In accordance with an embodiment of the invention, wavelength-converting layer 106 includes a base material and a fluorescent material. The fluorescent material is distributed in the base material, for example, in the form of particles. The fluorescent material converts the primary light, such as a blue light, to the secondary light, such as the white light. Examples of the base material may include optically clear silicone, acrylic, polycarbonate, and the like. The fluorescent material is selected according to the desired spatial spectral distribution of the secondary light. An example of the fluorescent material may include Yttrium Aluminum garnet (YAG) grains. Herein, the YAG grains may be, for example, Cerium (Ce)-activated and may contain doped gadolinium. In accordance with various embodiments of the invention, wavelength-converting layer 106 may be deposited by using, for example, a screen-printing process or a sol-gel method.

Further, the concentration of the fluorescent material in wavelength-converting layer 106 may be varied according to, for example, the desired spatial spectral distribution of the secondary light. In accordance with an embodiment of the invention, wavelength-converting layer 106 includes only a layer of the fluorescent material.

In accordance with an alternative embodiment of the invention, different fluorescent materials may be included in a single wavelength-converting layer, such as wavelength-converting layer 106.

In accordance with an embodiment of the invention, wavelength-converting layer 106 may further include, for example, rare earth metals to improve properties such as color rendering of wavelength-converting layer 106.

In accordance with various embodiments of the invention, the fluorescent material may convert the primary light, incident on the fluorescent material, to an intermediate light. Thereafter, the intermediate light may be combined with an unconverted primary light to generate the secondary light. The unconverted primary light may include, for example, the primary light that is not incident on the fluorescent material (for example, the primary light passes through wavelength-converting layer 106), and hence is not converted to the intermediate light. For example, when the blue light is incident on wavelength-converting layer 106, a portion of the blue light that is incident on the fluorescent material, such as YAG grains, may be converted to a yellow or an amber light by the YAG grains. The yellow light may then be combined with the unconverted blue light, to generate a substantially white light. Herein, the white light may have varying shades depending on the thickness of wavelength-converting layer 106, and the amount of the fluorescent material present in wavelength-converting layer 106. In accordance with an embodiment of the invention, the fluorescent material absorbs the primary light with a first wavelength and emits the intermediate light with a second wavelength, the second wavelength being longer than the first wavelength.

In accordance with an embodiment of the invention, when the primary light is the UV light, the fluorescent material may include blue, red and green phosphor grains, to generate the secondary light.

In accordance with various embodiments of the invention, the intermediate light may be combined with the unconverted primary light within wavelength-converting layer 106, or a separate diffuser layer may be used to combine the intermediate light with the unconverted primary light.

In accordance with an embodiment of the invention, light-transmitting zone 108 may include, for example, an optical waveguide, a light guide, a hollow light guide, and the like. Light-transmitting zone 108 may be made of, for example, a synthetic resin, acryl, polycarbonate, PMMA, glass, and the like. In accordance with various embodiments of the invention, remaining edge surface 114 may be inclined at zero or more degrees with respect to transmitting surface 112. In particular, light-transmitting zone 108 may have a wedge-shaped geometry.

In accordance with an embodiment of the invention, the secondary light may go through Total Internal Reflection (TIR) in light-transmitting zone 108. Herein, TIR is a phenomenon that causes reflection of a light, such as the secondary light, when the light traveling in a first medium with a higher refractive index, strikes an interface with a second medium with a lower refractive index. A necessary condition for TIR to occur is that the angle of incidence of the light with respect to the normal to the interface is greater than a critical angle of the combination of the first medium and the second medium. In accordance with an embodiment of the invention, the secondary light is transmitted though transmitting surface 112 by frustrating TIR. In accordance with an embodiment of the invention, wedge-shaped geometry of light-transmitting zone 108 facilitates frustration of TIR and subsequent transmission of the secondary light through transmitting surface 112.

Figure 1B:
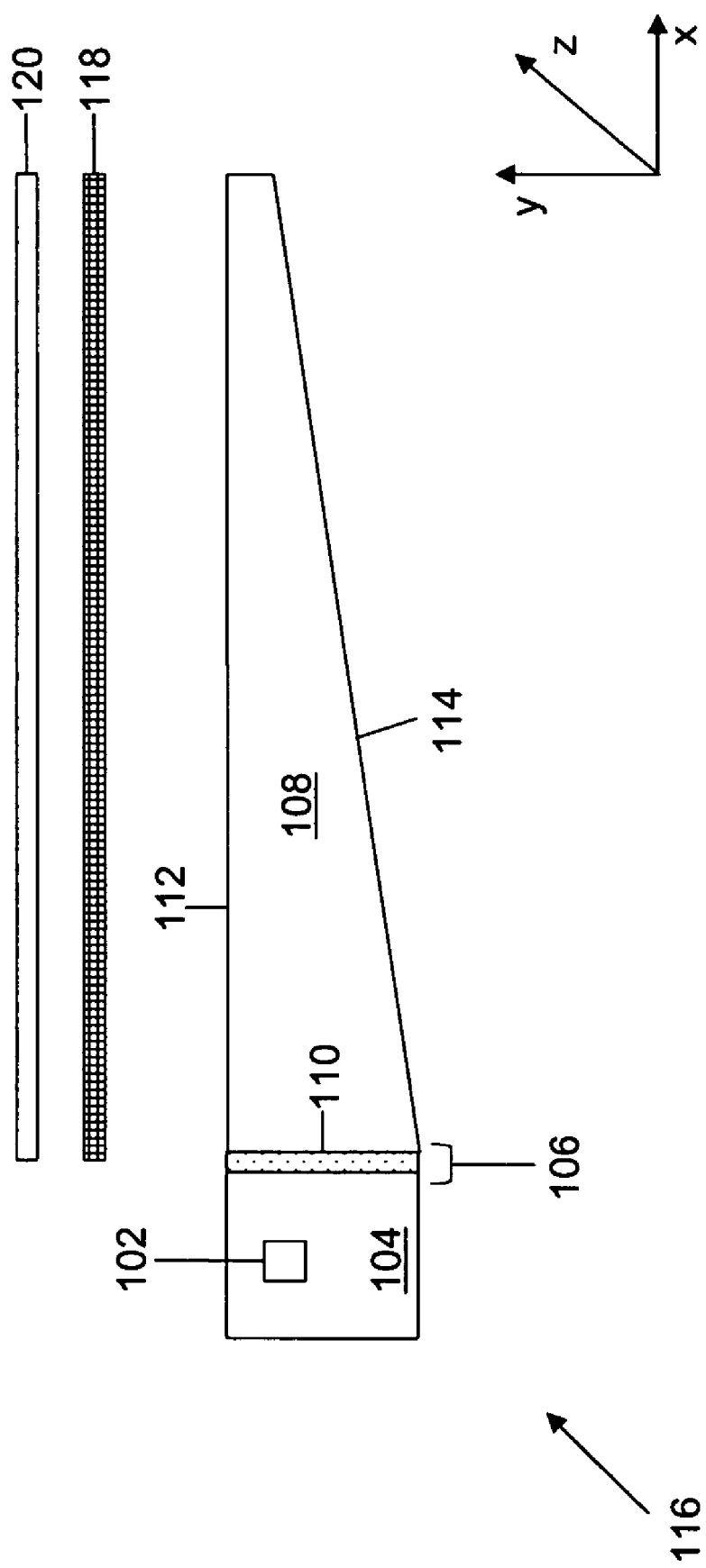

FIG. 1b illustrates a display system 116, in accordance with FIG. 1a. Display system 116 includes an illumination system, such as illumination system 100 (shown in FIG. 1a), one or more intermediate layers 118, hereinafter referred to as intermediate layers 118, and a display 120. Examples of display system 116 may include, but are not limited to, LCDs. Illumination system 100 is used to illuminate display 120. The secondary light, transmitted by illumination system 100, is made to pass through intermediate layers 118 before being used to illuminate display 120. In accordance with various embodiments of the invention, intermediate layers 118 may include one or more polarizing filters, one or more Thin Film Transistor (TFT) arrays, one or more. layers including liquid crystals, Red Green Blue (RGB) filters, and the like. In accordance with various embodiments of the invention, display 120 may be a transmissive display or a transflective display.

Figure 2A:
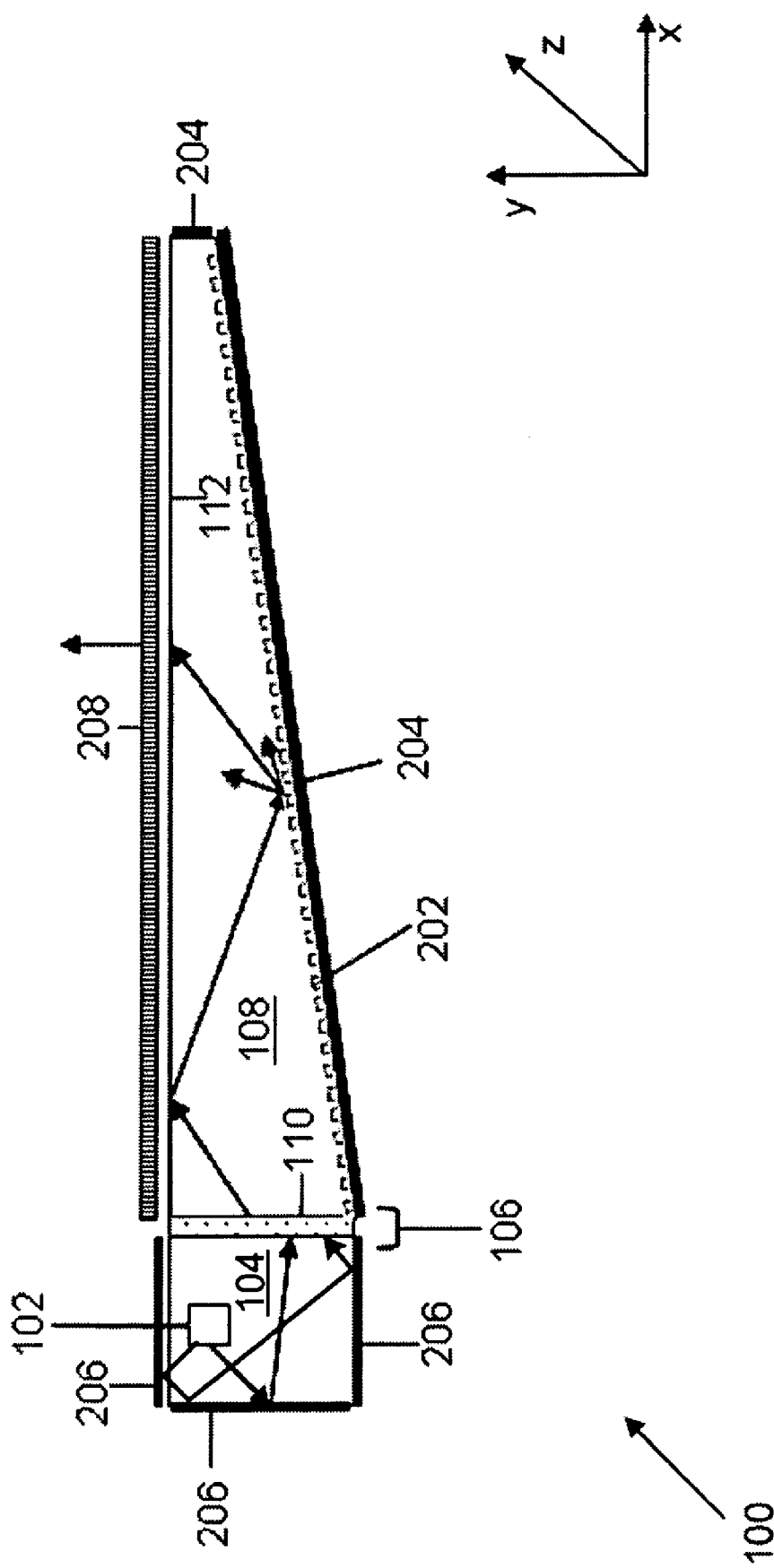

FIG. 2a is a cross section of illumination system 100, in accordance with FIG. 1a.

Herein, the cross section is taken along a plane that is parallel to a plane x-y (as shown in FIG. 2a). Illumination system 100 further includes a plurality of coupling members 202, hereinafter referred to as coupling members 202, one or more reflective surfaces 204, hereinafter referred to as reflective surfaces 204, one or more reflective surfaces 206, hereinafter referred to as reflective surfaces 206, and one or more diffusive layers 208, hereinafter referred to as diffusive layers 208. Coupling members 202 are provided to uniformly couple the secondary light out of light-transmitting zone 108. Further, coupling members 202 may be used to improve the outcoupling efficiency. Reflective surfaces 204 may be used, for example, to couple the secondary light out of light-transmitting zone 108 in a desired direction through, for example, transmitting surface 112. In accordance with an embodiment of the invention, the one or more remaining edge surfaces of light-transmitting zone 108 (as described in FIG. 1a) may include reflective surfaces 204.

Examples of a reflective surface 204 may include a mirrored surface, a white colored surface, and the like. Reflective surfaces 204 may also be used to homogenize the secondary light, prior to transmission. In accordance with an embodiment of the invention, the one or more remaining edge surfaces may be transparent, and may include 30 one or more reflective films, which reflect the secondary light into light-transmitting zone 108.

Light-mixing zone 104 includes reflective surfaces 206. Homogenization and uniform distribution of the primary light over wavelength-converting layer 106 may be achieved in light-mixing zone 104 by reflecting the primary light off the respective reflective surfaces 206 towards wavelength-converting layer 106. Examples of a reflective surface 206 may include a mirrored surface, a white colored surface, and the like The secondary light, coupled out of light-transmitting zone 108, is made to pass through diffusive layers 208. In accordance with an embodiment of the invention, diffusive layers 208 may be implemented in intermediate layers 118 (as shown in FIG. 1b). Diffusive layers 208 may be used to uniformly distribute the secondary light over, for example, display 120.

In FIG. 2a, arrows diagrammatically indicate the path of one or more light rays. A primary light ray, produced by one of light sources 102, enters light-mixing zone 104. In light-mixing zone 104, the primary light ray may be reflected, once or multiple times, and may subsequently be coupled into wavelength-converting layer 106, which generates a secondary light ray. The secondary light ray may be reflected or scattered once or multiple times, and may be coupled out of light-transmitting zone 108, for example, by using coupling members 202 and reflective surfaces 204.

Coupling members 202 couple the secondary light out of light-transmitting zone 108 by using, for example, reflection, refraction and scattering. In accordance with an embodiment of the invention, coupling members 202 may be used in conjunction with reflective surfaces 204, to couple the secondary light out of light-transmitting zone 108.

In accordance with various embodiments of the invention, coupling members 202 may include, for example, surface deformations including wedges and ridges, screen-printed dots, and the like. Coupling members 202 may be provided by using processes such as printing, pressing, etching, scribing, sandblasting, and the like.

In accordance with alternative embodiments of the invention, one or more surfaces of light-mixing zone 104 may include coupling members 202, to couple the primary light out of light-mixing zone 104 uniformly towards wavelength-converting layer 106. Further, one or more surfaces of light-mixing zone 104 may include coupling members 202, to couple the primary light into light-mixing zone 104, and to homogenize the primary light in light-mixing zone 104.

In accordance with various embodiments of the invention, wavelength-converting layer 106 may include coupling members 202, to couple the primary light into wavelength-converting layer 106. Further, wavelength-converting layer 106 may include coupling members 202 to couple the secondary light out of wavelength-converting layer 106. In accordance with an embodiment of the invention, one or more surfaces of wavelength-converting layer 106 may be made rough or may have microstructures, which may serve as coupling members 202.

Figure 2B:
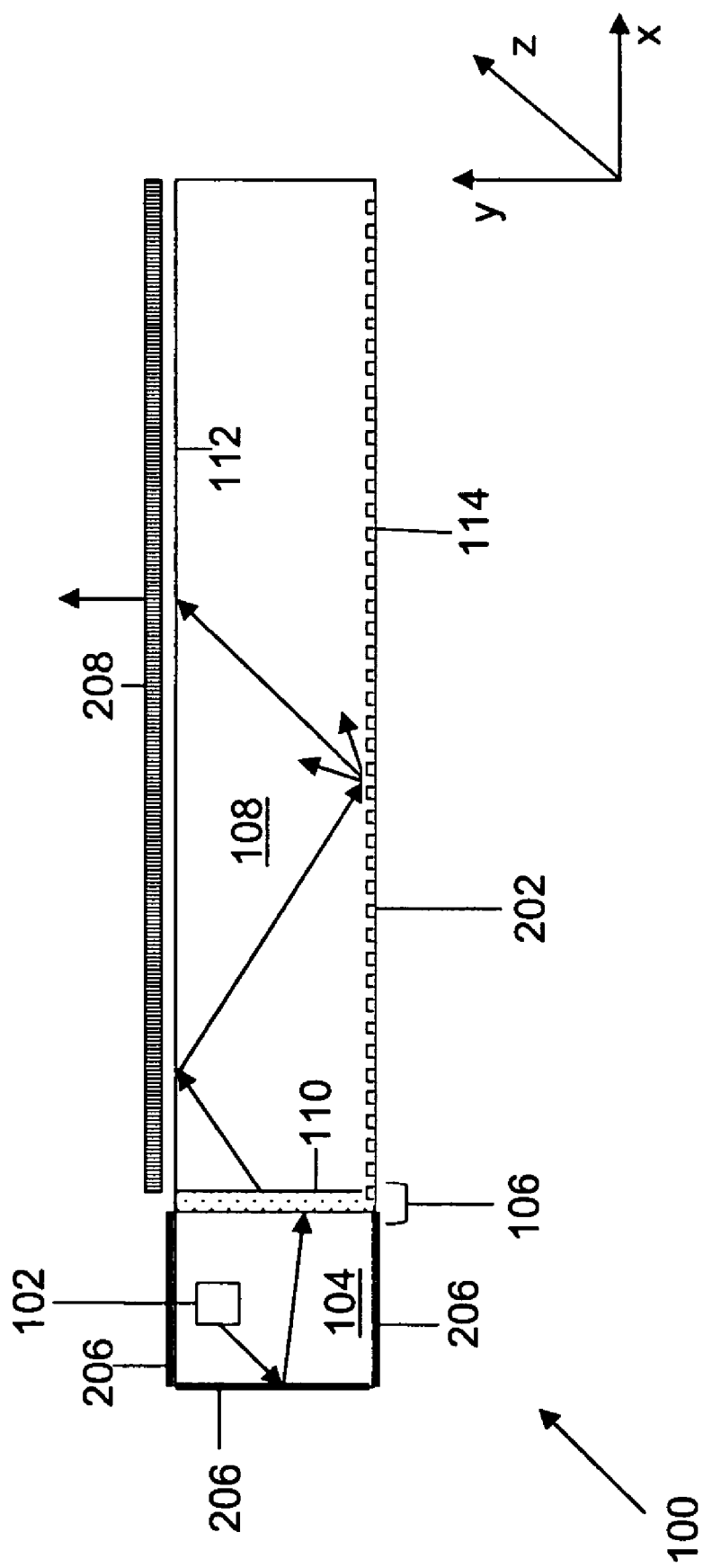
FIG. 2b is a cross section of an illumination system, in accordance with an alternative embodiment of the invention.

FIG. 2b is a cross section of illumination system 100, in accordance with FIG. 1a. Herein, the cross section is taken along a plane that is parallel to plane x-y. In FIG. 2b, an alternative geometry of light-transmitting zone 108 is illustrated, where the cross section is rectangular in shape. In accordance with an alternative embodiment of the invention, the cross section may have a trapezoidal geometry.

Figure 3A:
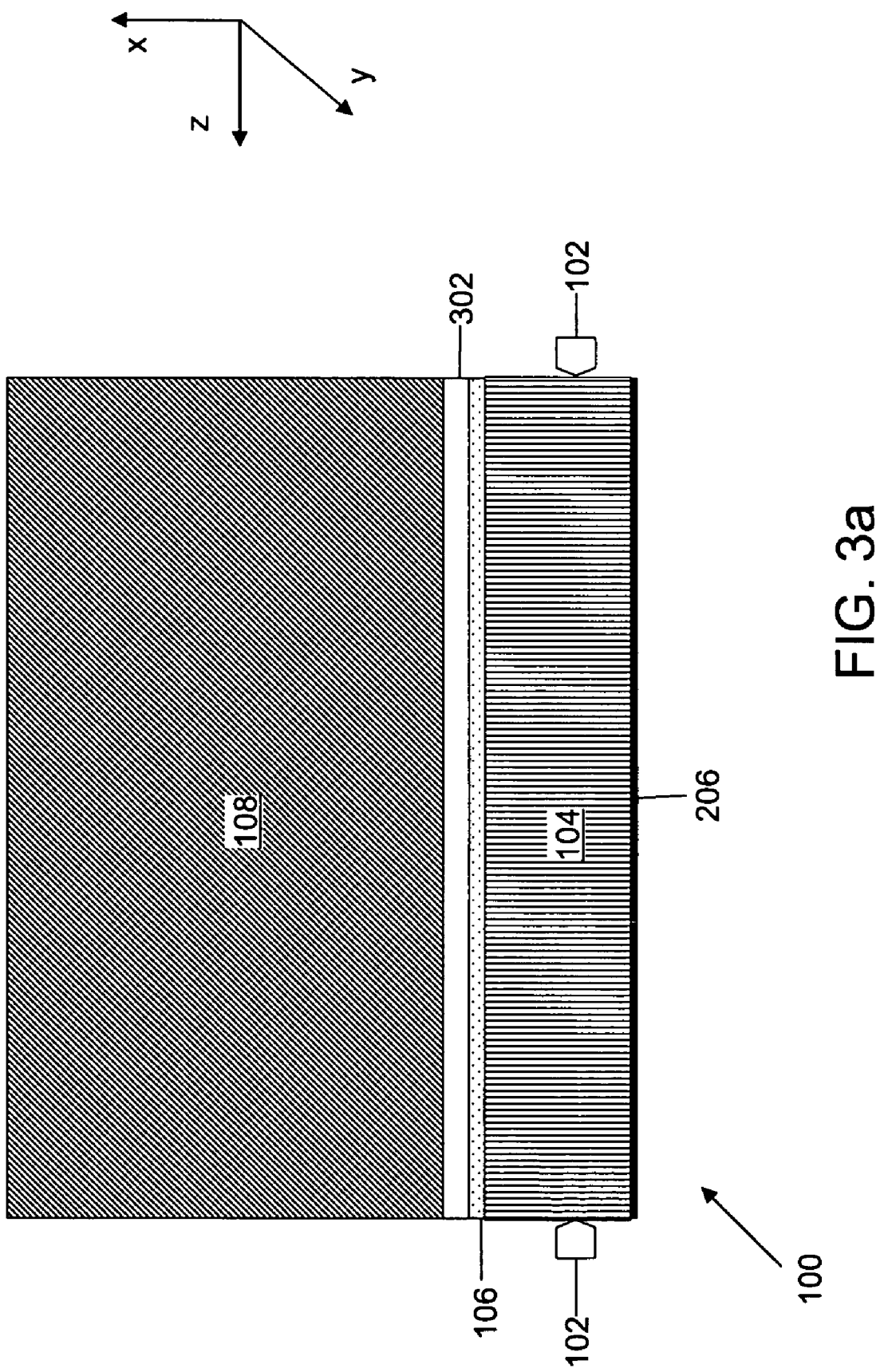
FIG. 3a is a cross section of an illumination system, in accordance with FIG. 1a and FIG. 1b.

FIG. 3a is a cross section of illumination system 100, in accordance with FIG. 1a and FIG. 1b. The cross section is taken along a plane that is parallel to plane z-x. Herein, wavelength-converting layer 106 and light-transmitting zone 108 are associated such that an airgap 302 is introduced between wavelength-converting layer 106 and light-transmitting zone 108. Airgap 302 may be used, for example, to ensure that the secondary light is within the critical angle of the light-transmitting zone 108.

Figure 3B:
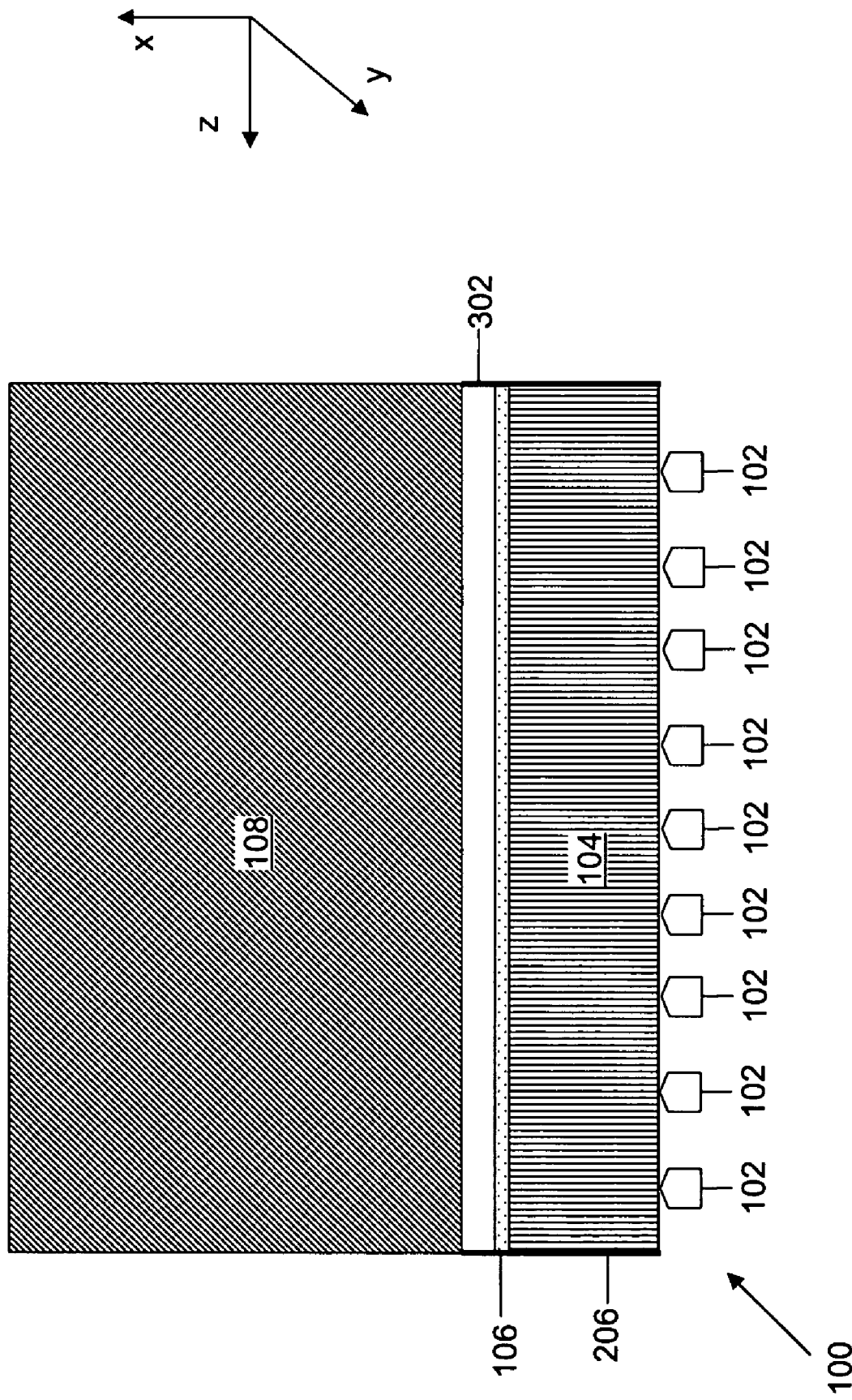
FIG. 3b is a cross section of an illumination system, in accordance with another alternative embodiment of the invention.

FIG. 3b is a cross section of illumination system 100, in accordance with FIG. 1a. The cross section is taken along a plane that is parallel to plane z-x. Herein, light sources 102 are arranged in a manner so as to form an array. In accordance with an embodiment of the invention, the central plane of the array is substantially parallel to the front surface of wavelength-converting layer 106.

In accordance with an embodiment of the invention, light-mixing zone 104 may further include sensors situated, for example, between any two light sources 102 in the array. The sensors may be used to ensure that the primary light produced by light sources 102 has a consistent brightness level and spatial spectral distribution.

Figure 3C:
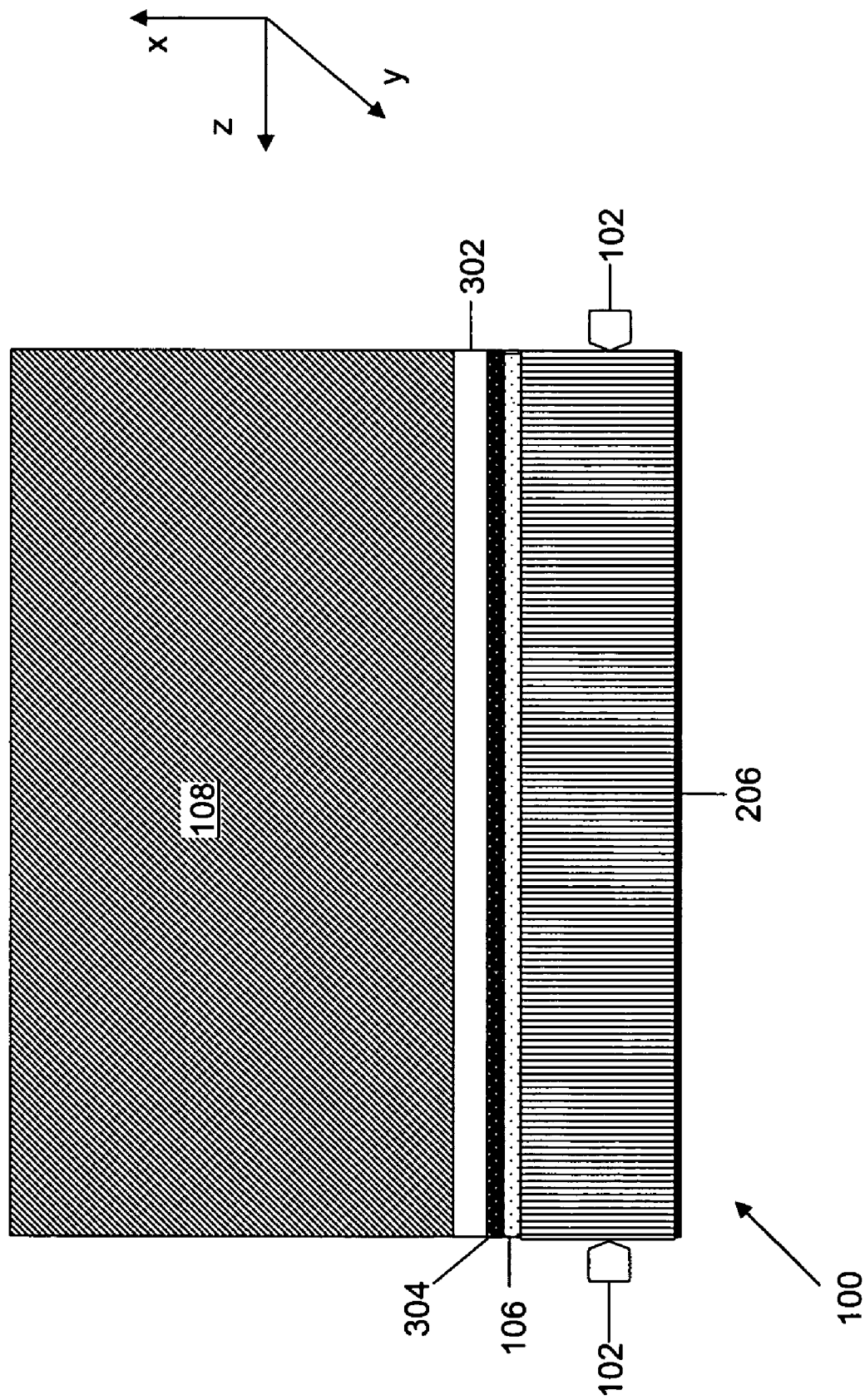

FIG. 3c is a cross section of illumination system 100, in accordance with FIG. 3a. One or more Brightness Enhancement Films (BEFs) 304, hereinafter referred to as BEFs 304, are introduced between wavelength-converting layer 106 and light-transmitting zone 108. BEF 304 may be used, for example, to focus the secondary light into light-transmitting zone 108. This increases the brightness of the secondary light in light-transmitting zone 108, and subsequently, the brightness of the secondary light transmitted by light-transmitting zone 108.

In accordance with another embodiment of the invention, wavelength-converting layer 106 and light-transmitting zone 108 may be associated by introducing one or more filters between wavelength-converting layer 106 and light-transmitting zone 108. The filters capture the unconverted primary light that may be coupled out of wavelength-converting layer 106. Herein, capturing may include absorbing the primary light or reflecting the primary light to wavelength-converting layer 106.

Figure 3D:
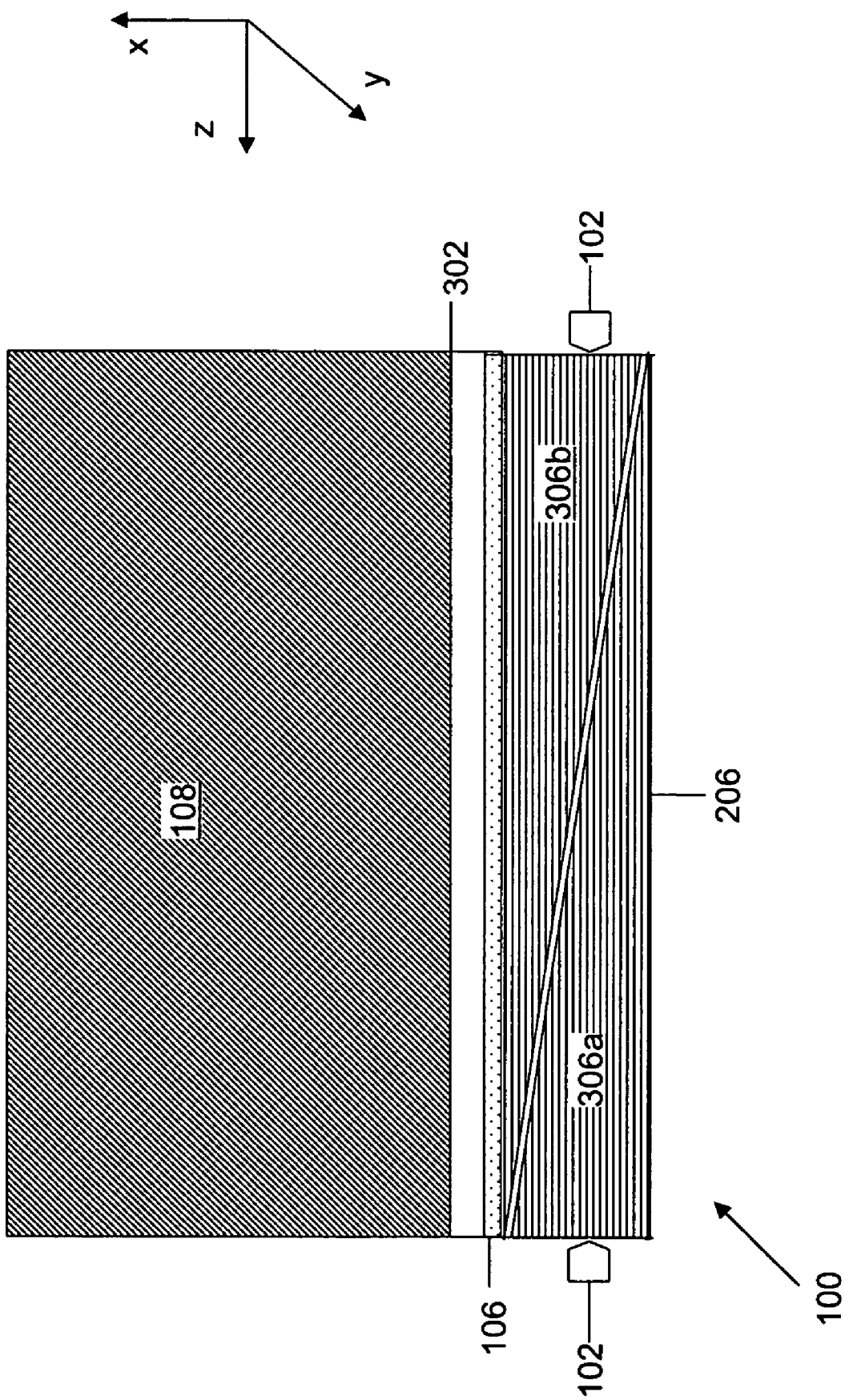

FIG. 3d is a cross section of illumination system 100, in accordance with FIG. 3a. The cross section is taken along a plane that is parallel to plane z-x. Herein, illumination system 100 includes a light guide 306a and a light guide 306b. Each of light guide 306a and light guide 306b have one tapered surface and are overlaid. In accordance with an embodiment of the invention, light guide 306a and light guide 306b uniformly distribute the primary light over wavelength-converting layer 106 and ensure substantial homogenization of the primary light in light-mixing zone 104. Each of light guide 306a and light guide 306b may be made of, for example, silicone, acrylic, polycarbonate, and the like. In accordance with an embodiment of the invention, each of light guide 306a and light guide 306b are coupled to one or more light sources 102.

In accordance with an embodiment of the invention, one or more light guides, such as light guide 306a and light guide 306b, may be used to uniformly distribute the primary light over wavelength-converting layer 106, and achieve substantial homogenization. Further, one or more light sources 102 may be used in conjunction with the one or more light guides. In accordance with an alternative embodiment, one or more surfaces of each of the one or more light guides may be tapered.

Figure 4:
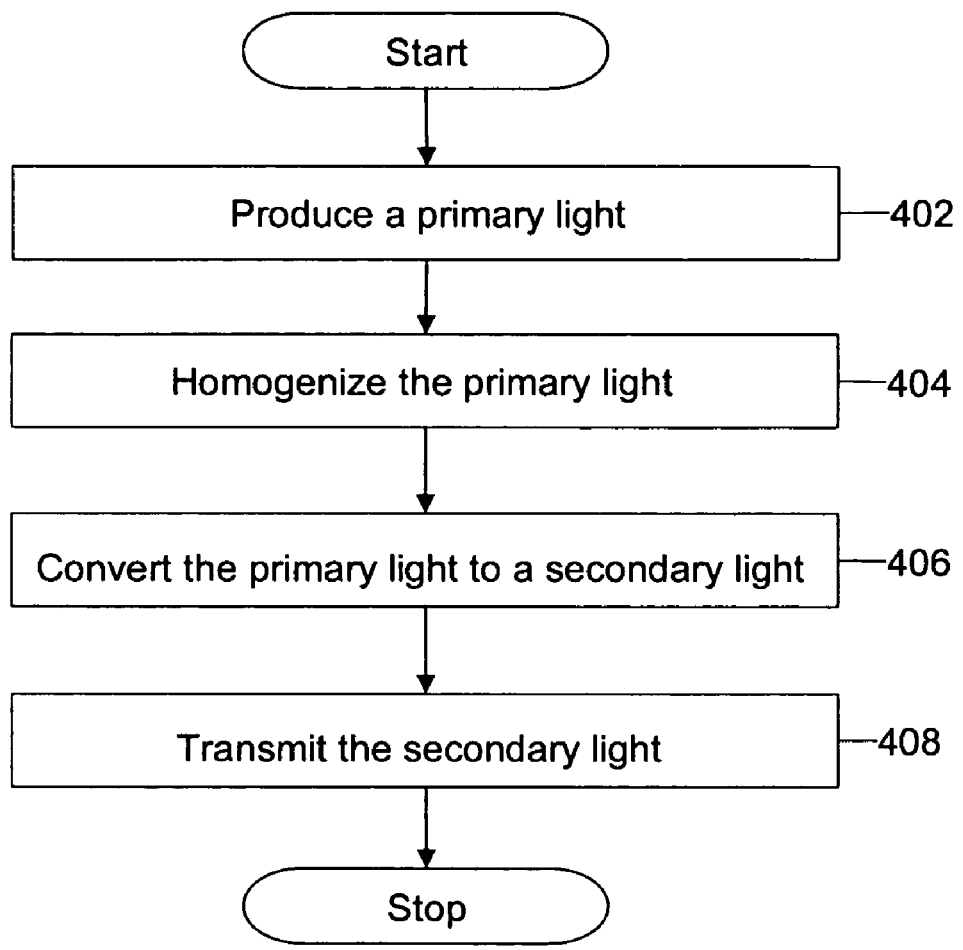
FIG. 4 is a flowchart of a method for illumination, in accordance with an embodiment of the invention.

FIG. 4 is a flowchart of a method for illumination, in accordance with an embodiment of the invention. At 402, a primary light is produced by using, for example, light sources 102. At 404, the primary light is homogenized by using, for example, light-mixing zone 104. At 406, the primary light is converted to a secondary light by using, for example, wavelength-converting layer 106. Herein, converting the primary light to the secondary light involves converting the primary light to an intermediate light. The intermediate light is then combined with the unconverted primary light to generate the secondary light. At 408, the secondary light is transmitted by using, for example, light-transmitting zone 108. In particular, the secondary light may be transmitted through, for example, transmitting surface 112. The transmitted secondary light may be used for illumination.

Various embodiments of the invention provide an illumination system and a method for illumination. The illumination system, such as illumination system 100, produces a uniform bright light with a uniform spatial spectral distribution. This is achieved by homogenizing the primary light in light-mixing zone 104, and uniformly distributing the primary light over wavelength-converting layer 106. The secondary light is also homogenized prior to transmission. Further, the illumination system is smaller in size. This is achieved by avoiding the use of packaging around light sources 102. In addition, the illumination system has a high efficiency. This is achieved by reducing transmission losses, for example, while coupling the light into light-mixing zone 104 from light sources 102.

By providing wavelength-converting layer 106 remote from the LEDs, rather than as part of each LED, various types of LEDs may be used, and the wavelength-converting layer 106 may be more easily constructed. Further, the remote wavelength-converting layer 106 provides additional mixing of the primary light generated by the LEDs.

Illumination system 100 may be provided as a single interconnected or integral unit of any size. Illumination system 100 may be used for illuminating an LCD for a cellular telephone, television, or other devices.

While various embodiments of the invention have been illustrated and described, it will be clear that the invention is not limited only to these embodiments. Numerous modifications, changes, variations, substitutions and equivalents will be apparent to those skilled in the art, without departing from the spirit and scope of the invention, as described in the claims.

What is claimed is:

1. An illumination system, the illumination system comprising:
   one or more light emitting diodes (LEDs) producing a first light;
   a hollow light-mixing zone, the hollow light-mixing zone being coupled to the one or more LEDs, the hollow light-mixing zone comprising multiple reflective walls that internally reflect the first light emitted by the one or more LEDs multiple times such that the first light reflected off the reflective walls is mixed within the hollow light-mixing zone, the reflective walls being formed of a non-transparent reflective material, wherein total internal reflection (TIR) is not used in the hollow light-mixing zone;
   a wavelength-converting layer coupled to an output of the hollow light-mixing zone, the hollow light-mixing zone being configured to substantially uniformly distribute the first light over the wavelength-converting layer by the multiple reflective walls reflecting and mixing the first light, the wavelength-converting layer converting the first light to a secondary light, the wavelength-converting layer containing a phosphor and the secondary light being a white light,
   the wavelength-converting layer having a surface facing the output of the hollow light-mixing zone, the multiple reflective walls being positioned to reflect the first light emitted by each LED at a plurality of angles with respect to the surface of the wavelength-converting layer such that reflected first light impinges on the surface of the wavelength-converting layer at a variety of angles,
   the hollow light-mixing zone comprising a light incident surface and at least three reflective walls, the reflective walls comprising a first reflective wall being substantially parallel with the wavelength-converting layer and being located opposite to the wavelength-converting layer, a second reflective wall being substantially perpendicular to the wavelength-converting layer, and a third reflective wall being substantially perpendicular to the wavelength-converting layer and opposing the second reflective wall, wherein the first reflective wall, the second reflective wall, and the third reflective wall have identical reflection characteristics, wherein the first, second and third reflective walls are perpendicular to the light incident surface; and a light-transmitting zone for redirecting the secondary light, the light-transmitting zone comprising:

a transmitting surface;

a first tapered surface; and a first flat surface, wherein the secondary light exits the light-transmitting zone from the transmitting surface, wherein the first flat surface is in a first plane adjacent to a second plane of the first tapered surface, wherein the first flat surface receives the secondary light from the wavelength-converting layer, and wherein the first reflective wall of the hollow light-mixing zone, the wavelength-converting layer and the first flat surface are parallel to each other; and wherein the at least one of the LEDs is located between the first reflective wall and the wavelength-converting layer and disposed adjacent to the outside of the light incident surface to direct light into the hollow light-mixing zone, wherein the wavelength-converting layer is located at the first flat surface of the light-transmitting zone, wherein the first flat surface of the light-transmitting zone is adjacent to the first tapered surface.

2. The illumination system according to claim 1, wherein the one or more LEDs are selected from the group consisting of one or more blue LED, one or more Ultra Violet (UV) LED and one or more near-UV LED.

3. The illumination system according to claim 1, wherein the wavelength-converting layer is an Yttrium Aluminum Garnet (YAG) phosphor layer.

4. The illumination system according to claim 1, wherein the wavelength-converting layer is a blue, red, and green phosphor layer.

5. The illumination system according to claim 1, wherein the wavelength-converting layer comprises a plurality of optical coupling members, the plurality of optical coupling members coupling the secondary light out of the wavelength-converting layer.

6. The illumination system according to claim 1, wherein the wavelength converting layer comprises a plurality of optical coupling members, the plurality of optical coupling members coupling the first light into the wavelength-converting layer.

7. The illumination system according to claim 1, wherein the light-transmitting zone is an optical waveguide.

8. The illumination system according to claim 1, wherein the light-transmitting zone comprises a plurality of optical coupling members, the plurality of optical coupling members coupling the secondary light out of the light-transmitting zone.

9. The illumination system according to claim 1, wherein the first tapered surface reflects the secondary light towards the transmitting surface.

10. The illumination system according to claim 1, wherein the first tapered surface is inclined at zero or more degrees with respect to the transmitting surface.

11. The illumination system according to claim 1, wherein the first flat surface is associated with the wavelength-converting layer such that an air gap exists between the first flat surface and the wavelength-converting layer.

12. The illumination system according to claim 1, wherein the first flat surface is associated with the wavelength-converting layer such that one or more Brightness Enhancement Films (BEFs) are introduced between the wavelength-converting layer and the first flat surface.

13. The illumination system according to claim 1, wherein the first flat surface is associated with the wavelength-converting layer such that one or more filters are introduced between the wavelength-converting layer and the first flat surface, the one or more filters capturing an unconverted first light, the unconverted first light being a portion of the first light that is not converted to the secondary light by the wavelength-converting layer.

14. A display system, the display system comprising:

a Liquid Crystal Display (LCD); and a backlighting system, the backlighting system illuminating the LCD, the backlighting system comprising:

one or more light emitting diodes (LEDs), the one or more LEDs producing a first light;

a hollow light-mixing zone, the hollow light-mixing zone coupled to the one or more LEDs, the hollow light-mixing zone comprising multiple reflective walls that internally reflect light emitted by the one or more LEDs multiple times such that the first light reflected off the reflective walls is mixed within the hollow light-mixing zone, the reflective walls being formed of a non-transparent reflective material, wherein total internal reflection (TIR) is not used in the light-mixing hollow zone;

a wavelength-converting layer coupled to an output of the hollow light-mixing zone, the hollow light-mixing zone being configured to substantially uniformly distribute the first light over the wavelength-converting layer by the multiple reflective walls reflecting and mixing the light, the wavelength-converting layer converting the first light to a secondary light, the wavelength-converting layer containing a phosphor and the secondary light being a white light, the wavelength-converting layer having a surface facing the output of the hollow light-mixing zone, the multiple reflective walls being positioned to reflect the first light emitted by each LED at a plurality of angles with respect to the surface of the wavelength- converting layer such that reflected first light impinges on the surface of the wavelength-converting layer at a variety of angles, the hollow light-mixing zone comprising a light incident surface and at least three reflective walls, the reflective walls comprising a first reflective wall being substantially parallel with the wavelength-converting layer and being located opposite to the wavelength-converting layer, a second reflective wall being substantially perpendicular to the wavelength-converting layer, and a third reflective wall being substantially perpendicular to the wavelength-converting layer and opposing the second reflective wall, wherein the first reflective wall, the second reflective wall, and the third reflective wall have identical reflection characteristics, wherein the first, second and third reflective walls are perpendicular to the light incident surface; and a light-transmitting zone for redirecting the secondary light, the light-transmitting zone comprising:

a transmitting surface;

a first tapered surface; and a first flat surface, wherein the secondary light exits the light-transmitting zone from the transmitting surface, wherein the first flat surface is in a first plane adjacent to a second plane of the first tapered surface, wherein the first flat surface receives the secondary light from the wavelength-converting layer, and wherein the first reflective wall of the hollow light-mixing zone, the wavelength-converting layer and the first flat surface are parallel to each other; and wherein the at least one of the LEDs is located between the first reflective wall and the wavelength-converting layer and disposed adjacent to the outside of the light incident surface to direct light into the hollow light-mixing zone, wherein the wavelength-converting layer is located at the first flat surface of the light-transmitting zone, wherein the first flat surface of the light-transmitting zone is adjacent to the first tapered surface.

15. The display system according to claim 14 further comprising one or more intermediate layers, the one or more intermediate layers being situated between the LCD and the backlighting system.

16. A method for illuminating, the method comprising:
generating a first light, the first light being generated by energizing one or more light emitting diodes (LEDs);
homogenizing the first light, the first light being homogenized in a hollow light-mixing zone, wherein the hollow light-mixing zone is coupled to the one or more LEDs, the hollow light-mixing zone comprising multiple reflective walls that internally reflect light emitted by the one or more LEDs multiple times such that light reflected off the reflective walls is mixed within the hollow tight-mixing zone, the reflective walls being formed of a non-transparent reflective material, wherein total internal reflection (TIR) is not used in the hollow light-mixing zone;
converting the first light to a secondary light, the conversion of the first light to the secondary light being performed by a wavelength-converting layer, wherein the wavelength-converting layer is coupled to an output of the hollow .light-mixing zone, the hollow light-mixing zone being configured to substantially uniformly distribute the first .light over the wavelength-converting layer by the multiple reflective walls reflecting and mixing the first light, the wavelength-converting layer containing a phosphor and the secondary light being a white light,
the wavelength-converting layer having a surface facing the output of the hollow light-mixing zone, the multiple reflective walls reflecting the first light emitted by each LED at a plurality of angles with respect to the surface of the wavelength-converting layer such that reflected first light impinges on the surface of the wavelength-converting layer at a variety of angles,
the hollow light-mixing zone comprising a light incident surface and at least three reflective walls, the reflective walls comprising a first reflective wall being substantially parallel with the wavelength- converting layer and being located opposite to the wavelength-converting layer, a second reflective wall being substantially perpendicular to the wavelength-converting layer, and a third reflective wall being substantially perpendicular to the wavelength-converting layer and opposing the second reflective wall, wherein the first reflective wall, the second reflective wall, and the third reflective wall have identical reflection characteristics, wherein the first, second and third reflective walls are perpendicular to the light incident surface; and
transmitting the secondary light, the transmission of the secondary light being performed through a transmitting surface of a light-transmitting zone,
the light-transmitting zone further comprising a first tapered surface and a first flat surface,
wherein the secondary light exits the light-transmitting zone from the transmitting surface, wherein the first flat surface is in a first plane adjacent to a second plane of the first tapered surface, wherein the first flat surface receives the secondary light from the wavelength-converting layer, and wherein the first reflective wall of the hollow light-mixing zone, the wavelength-converting layer and the first flat surface are parallel to each other; and
wherein the at least one of the LEDs is located between the first reflective wall and the wavelength-converting layer and disposed adjacent to the outside of the light incident surface to direct light into the hollow light-mixing zone, wherein the wavelength-converting layer is located at the first flat surface of the light-transmitting zone, wherein the first flat surface of the light-transmitting zone is adjacent to the first tapered surface.

17. The method according to claim 16, wherein the first light is selected from the group consisting of a blue light, an Ultra Violet (UV) light and a near-UV light.

* * * * *